United States Patent Office 2,904,405
Patented Sept. 15, 1959

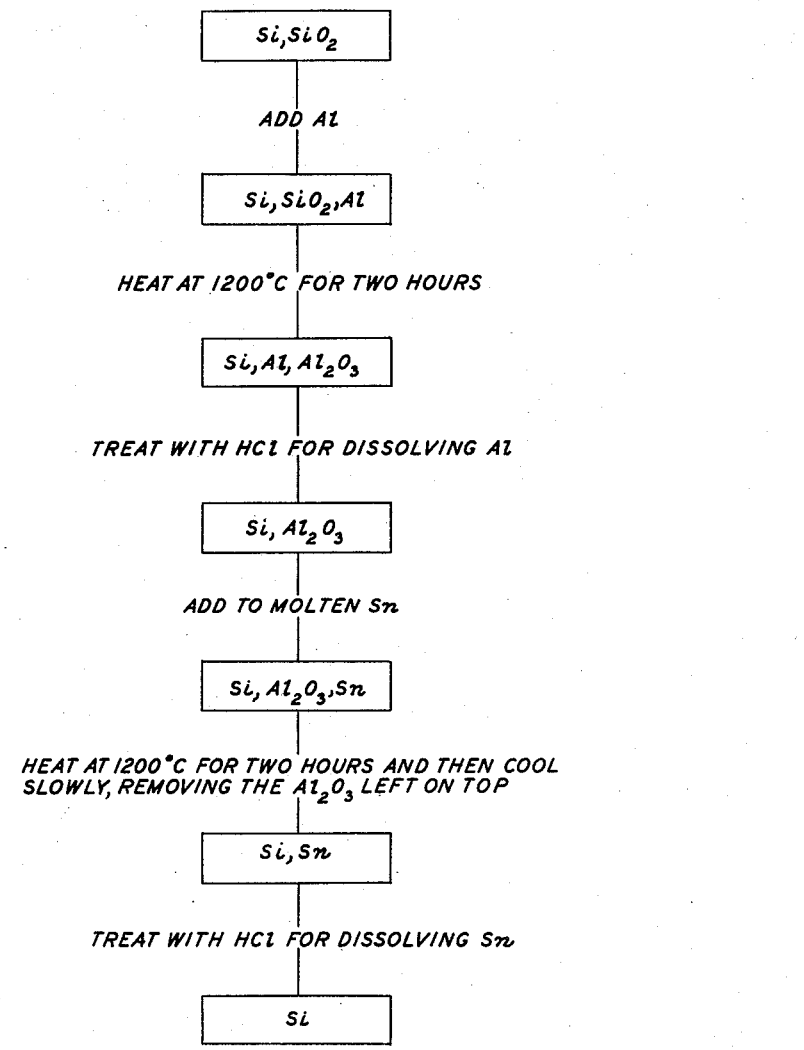

2,904,405

RECOVERY OF SILICON FROM SILICON DIOXIDE

Carl D. Thurmond, Sterling, N.J., assignor to Bell Telephone Laboratories, Incorporated, New York, N.Y., a corporation of New York Application October 31, 1957, Serial No. 693,640

3 Claims. (Cl. 23—223.5)

This invention relates to a process for recovering silicon from silicon dioxide.

An object of the invention is to increase the yield of recovery of silicon from silicon dioxide.

Because of the ready availability of a large supply of inexpensive silicon dioxide, prior art processes for the recovery of silicon from silicon dioxide have been designed with little emphasis on the degree of recovery of the silicon and, as a result, such processes have, in fact, generally been relatively inefficient in extracting the total amount of silicon available. However, in some instances there arises a need for a process of high efficiency for the recovery of silicon. For example, there is a need for silicon of extremely high isotopic abundance of $Si^{28}$ for use as the active material in solid state microwave devices which depend on the stimulated emission of radiation. Natural silicon contains 92.28 percent $Si^{28}$, 4.67 percent $Si^{29}$ and 3.05 percent $Si^{30}$. Typically, the process used for the isotopic separation of silicon results in an equal mole mixture of $Si^{28}$ and $Si^{28}O_2$. Since the expense of isotopic separation is considerable, the cost of such a mixture is high and the recovery of the silicon present in the silicon dioxide seems desirable. In such an instance, a process of recovery of high efficiency becomes important. The present invention is directed at a process which provides a high yield of recovery of the silicon present in silicon dioxide.

Moreover, because of the use to which the silicon is to be put, it is necessary that the silicon recovered either be of high purity or in a state to be readily purified to high purity. As a consequence, it is important to avoid in the recovery process steps which result in the contamination of the silicon with deleterious impurities which cannot be readily removed.

The process of the invention involves a series of steps. Initially aluminum, typically in granular form, is added to the silicon dioxide and both are heated together for a time and at a temperature to reduce the silicon dioxide by the formation of aluminum oxide. Enough aluminum is added to insure complete reduction of the $SiO_2$. There then results a mixture which includes silicon, aluminum and aluminum oxide. Thereafter, the excess aluminum is removed, typically by the action of an acid which attacks the aluminum selectively such as hydrofluoric or hydrochloric acid. The silicon is then recovered by heating the silicon and aluminum oxide mixture in molten tin and cooling the melt to form crystallites of silicon in the ingot. The aluminum oxide is insoluble in the tin so that it is readily separated from the ingot and not wet by it. Thereafter, the tin is removed from the tin-silicon mixture, typically by the action of an acid which attacks the tin selectively, such as hydrofluoric or hydrochloric acid.

Aluminum has been found uniquely suited for use in this process. It has good properties for use in reducing the silicon dioxide and additionally aluminum oxide, the reaction product formed, can be easily separated from the silicon by the use of tin in the manner described. Tin is advantageous for use in the separation of the aluminum oxide from the silicon both because of the ease with which it can be separated from the silicon and because any residual tin has no deleterious effect on the properties of the silicon of interest.

The drawing illustrates in block diagram form the successive steps of a specific application of the invention.

In one specific example of the practice of the invention five grams of an equal mole mixture of Si and $SiO_2$ containing silicon of isotopic abundance 99.98±.02 $Si^{28}$ was mixed with fifteen grams of aluminum in granular form so as to pass through a size 8 mesh screen, and the resultant was heated in an aluminum oxide crucible at 1200 degrees C. for two hours, which was time sufficient for reducing all the silicon dioxide. Since it is important to avoid oxygen in the heating atmosphere, an inert gas, such as argon, was used for this purpose. To insure reduction of all the silicon dioxide, it was important to provide an excess of aluminum. An excess of aluminum in this case was represented by more aluminum atoms than two-thirds the number of oxygen atoms in the mixture. Of course, if less aluminum is used, the reduction will proceed to the extent of available aluminum.

As a result of this heating step there resulted a mixture which included silicon, aluminum oxide and aluminum. It was desirable to remove the excess aluminum before proceeding to the separation of the silicon from the aluminum oxide. To this end, the mixture was soaked in an aqueous solution of hydrochloric acid for half an hour, which was adequate time for dissolving the excess aluminum in the mixture. Various other reagents will be known to a worker in the art for this purpose. Upon completion of this step, the solid remainder of the mixture consisted of silicon and aluminum oxide.

The solid remainder was then combined with 110 grams of tin, a quantity sufficient for the dissolution of all the silicon, and the resultant was heated in an aluminum oxide crucible to 1200 degrees C. and maintained at this temperature in an argon atmosphere for two hours. At the end of this time, the silicon had dissolved entirely in the molten tin. Since the aluminum oxide was insoluble in and not wet by the tin, it became separated from the tin-silicon solution. After the removal of the aluminum oxide the melt was slowly cooled. Slow cooling aided in the formation of relatively large crystallites of silicon in the ingot. Alternatively, the aluminum oxide can be removed after cooling. Thereafter, the silicon-tin ingot was soaked in concentrated hydrochloric acid for thirty-six hours which was adequate time for dissolving the tin, and there was left a residue of granular silicon.

In practice, it was generally desirable to form the granular silicon resulting into a rod to make possible subsequent zone refining of it by means of the floating zone technique. Typically the rod formation was accomplished by heating in a vacuum the lower end of a silicon seed crystal to form there a droplet of molten silicon which was supported by surface tension and then by bringing the granular silicon temporarily into contact with the droplet for causing granules of the silicon to adhere to and become fused with the droplet. After some accretion, the molten end of the seed was allowed to cool and recrystallize. The process was repeated until substantially all of the granular silicon had been embodied in the growing rod.

Growing the rod in this way served also to refine the silicon by vaporizing the remaining traces of tin.

At the end of the steps described up to this point, it was found that the silicon recovered amounted to about 90 percent of the total silicon in the starting mixture of silicon and silicon dioxide.

The rod was then zone refined by the floating zone technique known to workers in the art and formed into a single crystal.

It is to be understood that the specific example described is merely illustrative of the principles of the invention. Variations will be evident to one skilled in the art which do not depart from the spirit and scope of the invention. In particular, the process is not limited to the use of starting material which includes elemental silicon and or to the recovery of $Si^{28}$.

What is claimed is:

1. The process of recovering silicon from silicon dioxide comprising the steps of reacting aluminum with the silicon dioxide to reduce the silicon dioxide and to form a mixture of silicon and aluminum oxide, removing the excess aluminum from the mixture, combining the mixture with molten tin for the selective dissolution of the silicon in the molten tin and for the separation out of the insoluble aluminum oxide, cooling the silicon-tin solution for forming a silicon-tin ingot, and removing the tin from the ingot for leaving a silicon residue substantially free of aluminum inclusions and amenable to fusion into a bulk form.

2. The process of recovering silicon from silicon dioxide comprising the steps of reacting excess aluminum with the silicon dioxide to reduce the silicon dioxide and to form a mixture including silicon, aluminum oxide, and the excess aluminum, removing the excess aluminum from the mixture, combining the remainder of the mixture with molten tin for the selective dissolution of the silicon in the molten tin and for the separation of the insoluble aluminum oxide, cooling the silicon-tin solution at a rate conducive to the formation of silicon crystallites in the silicon-tin ingot, and removing the tin from the ingot for leaving a residue of silicon crystallites substantially free of aluminum inclusions and amenable to fusion into a bulk form.

3. The process of recovering silicon from silicon dioxide comprising the steps of reacting an excess of aluminum with silicon dioxide to reduce the silicon dioxide and form a mixture of silicon, aluminum and aluminum oxide, dissolving the aluminum from the mixture by an acid which acts selectively on the aluminum, combining the remainder of the mixture with molten tin for the selective dissolution of the silicon in the molten tin and for the separation therefrom of the insoluble aluminum oxide, cooling the molten tin-silicon solution slowly for forming crystallites of silicon in the tin-silicon ingot, and dissolving the tin from the ingot by an acid which acts selectively on the tin for leaving a residue of silicon crystallites substantially free of aluminum inclusions and amenable to fusion into a bulk form.

References Cited in the file of this patent

UNITED STATES PATENTS 2,265,219     Sturbelle _____ Dec. 9, 1941

OTHER REFERENCES

Mellor: "A comprehensive Treatise on Inorganic and Theoretical Chemistry," vol. 6, page 149, Longmans, Green and Co.; Impression, March 1947.